Figure 1:
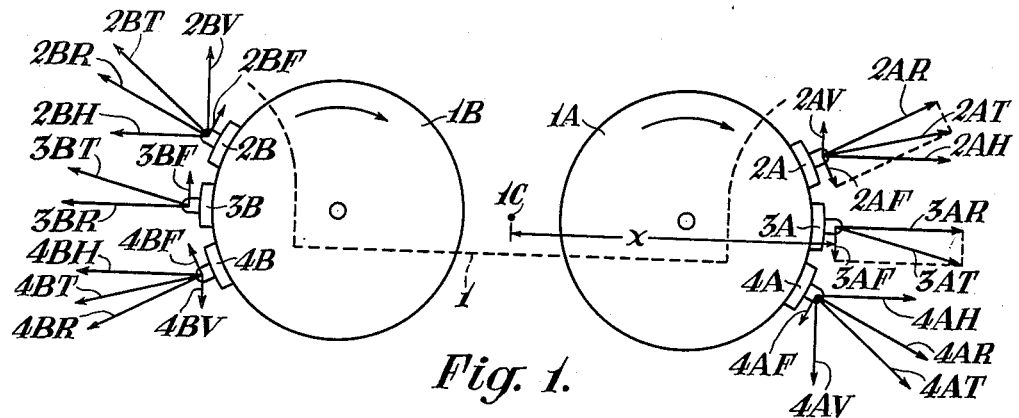

Nov. 17, 1953       E. G. MUELLER       2,659,456
BRAKE MECHANISM

Filed July 30, 1948       4 Sheets-Sheet 1

INVENTOR.
Emil G. Mueller
BY
HIS ATTORNEY

Nov. 17, 1953  E. G. MUELLER  2,659,456
BRAKE MECHANISM
Filed July 30, 1948  4 Sheets-Sheet 2
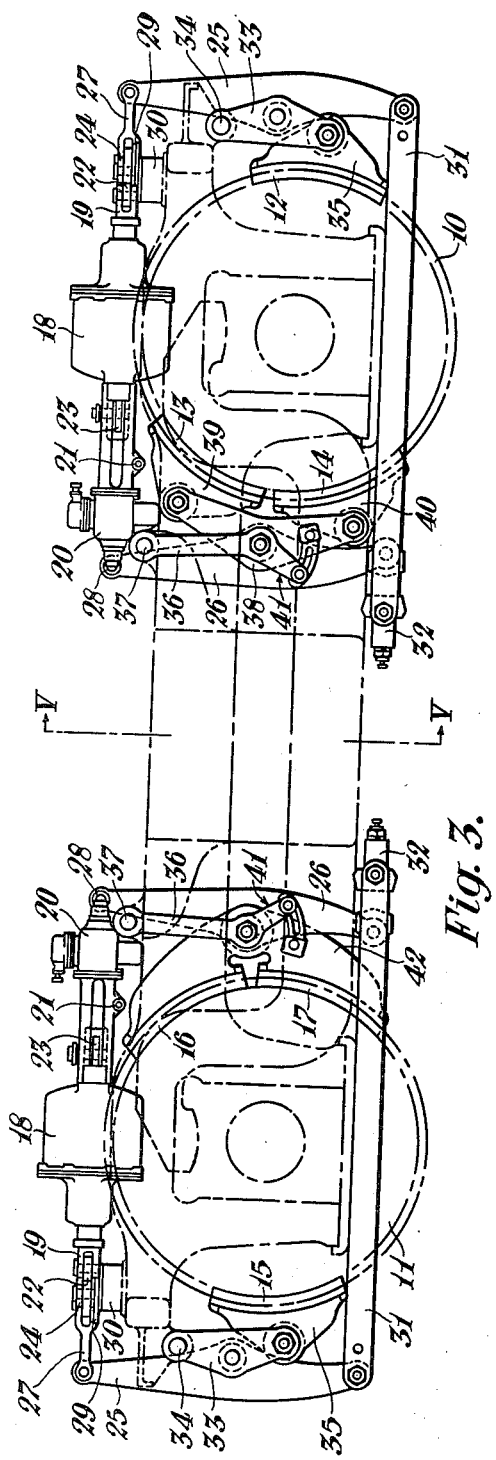
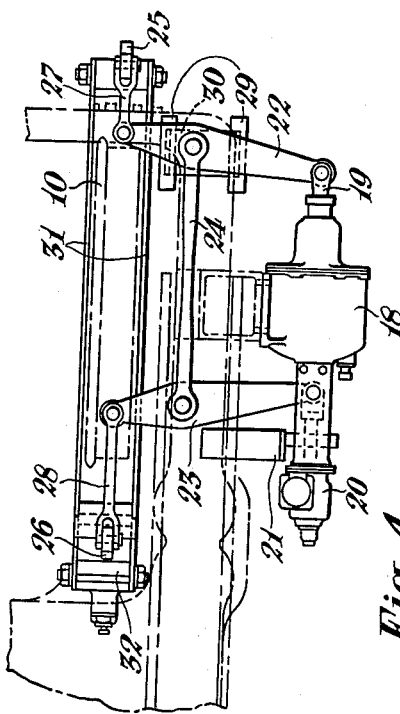
INVENTOR.
Emil G. Mueller
BY
HIS ATTORNEY Nov. 17, 1953

E. G. MUELLER 2,659,456

BRAKE MECHANISM

Filed July 30, 1948

4 Sheets-Sheet 3

INVENTOR.
Emil G. Mueller
BY
HIS ATTORNEY

Nov. 17, 1953    E. G. MUELLER    2,659,456
BRAKE MECHANISM
Filed July 30, 1948    4 Sheets-Sheet 4

INVENTOR.
Emil G. Mueller
BY
HIS ATTORNEY

Patented Nov. 17, 1953

2,659,456

UNITED STATES PATENT OFFICE 2,659,456

BRAKE MECHANISM

Emil G. Mueller, Churchill, Pa., assignor to The American Brake Company, Swissvale, Pa., a corporation of Missouri Application July 30, 1948, Serial No. 41,650

9 Claims. (Cl. 188—56)

My invention relates to brake mechanism for railway trucks. It is described herein as applied to a truck for an electrically propelled locomotive adapted for operation in either direction. Certain features of my invention are of especial utility in connection with trucks adapted for operation in either direction. Certain other features are of especial utility in connection with trucks for electrically propelled locomotives. Still other features are of general utility in connection with railway trucks.

The phrase "electrically propelled locomotive" as used herein is intended to include any locomotive whose drive wheels are rotated by electric motors, regardless of the source of the electrical energy supplied to the motors. Such locomotives commonly have the space between their drive wheels largely taken up by motors and driving gears, so that the space available for the brake mechanism is limited.

When a brake shoe is applied to a rotating wheel on a railway truck, the reactive and frictional forces on the shoe produce a moment tending to tip or rotate the truck about its lateral axis. This "truck tipping" effect is one of the factors which limits the permissible braking force and hence must be considered when making a choice of a brake mechanism for a railway truck.

A railway truck adapted for normal operation in either direction must be provided with brakes which operate equally well in either direction. It is therefore usual to provide such a truck with a brake shoe arrangement which is symmetrical about the lateral axis of the truck. This limits the number of possible brake shoe arrangements which may be considered for such a truck.

It is an object of my invention to provide a brake mechanism in which the "truck tipping" effect is minimized.

Another object is to provide an improved brake mechanism for a railway truck adapted to be operated in either direction.

A further object of my invention is to provide an improved compact brake rigging of the unit cylinder type.

I accomplish these objects by providing a brake mechanism for a four-wheel truck including one shoe for each wheel on the side of the wheel farthest from the truck center and two shoes for each wheel on the side of the wheel nearest the truck center. It is demonstrated in connection with Figs. 1 and 2 that for any symmetrical arrangement of brake shoes, the moments of the shoes nearest the center of the truck act in opposition to the moments of the shoes nearest the ends of the truck. Since the end shoes are farther from the truck center, their moment arms are greater and hence the tipping moments of the end shoes are greater per shoe. I overcome this predominance of the tipping moments of the end shoes by using two shoes on the center side of each wheel and only one shoe on the side of the wheels nearest the ends of the truck.

On a six-wheel truck, the brake shoe arrangement on the end wheels is the same as on the four-wheel truck. The center wheels of the six-wheel truck are likewise provided with two shoes on one side and one on the other, but the brake shoes are arranged oppositely on the center wheels on opposite sides of the truck.

My improved unit cylinder brake rigging includes a brake cylinder, an automatic slack adjuster, two transverse levers having their outer ends respectively connected to the piston rod of the cylinder and the automatic slack adjuster, two vertical levers having their upper ends respectively connected to the inner ends of the transverse levers, a tie rod connecting the lower ends of the two vertical levers, brake hangers on either side of the wheel, connections between the brake hangers and intermediate points on the vertical levers, and brakeheads and shoes carried by the hangers. Three species of unit cylinder brake rigging are disclosed herein. These three species differ as to the brake shoe and brakehead arrangements in each case, and one species differs from the other two in the arrangement of the transverse levers.

Other objects and characteristic features of my invention will become apparent as the description proceeds.

I shall describe several forms of brake mechanism embodying my invention, and shall then point out the novel features thereof in claims.

Figure 2:
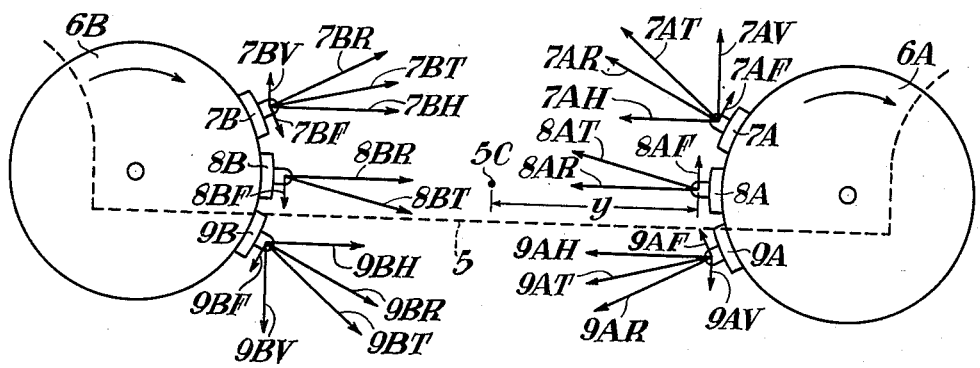
Figure 5:
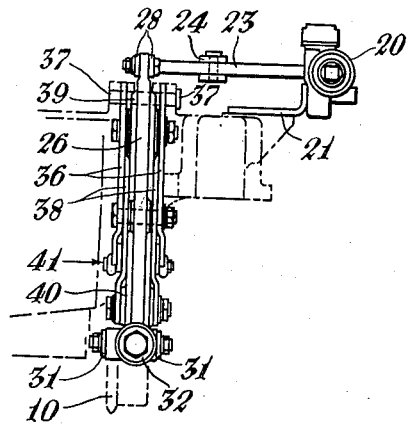
Figure 6A:
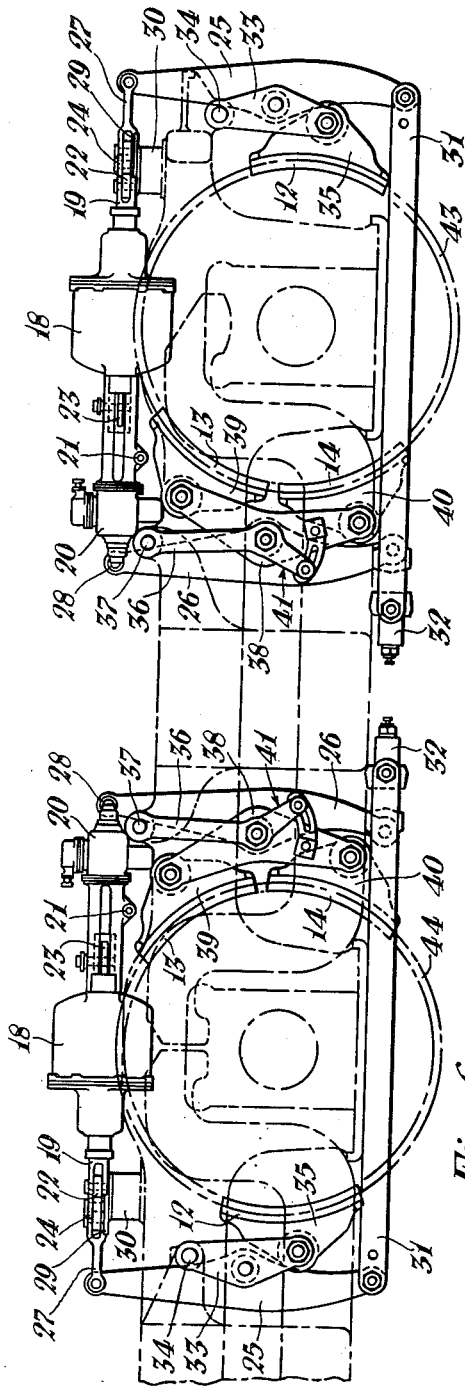
Figure 6B:
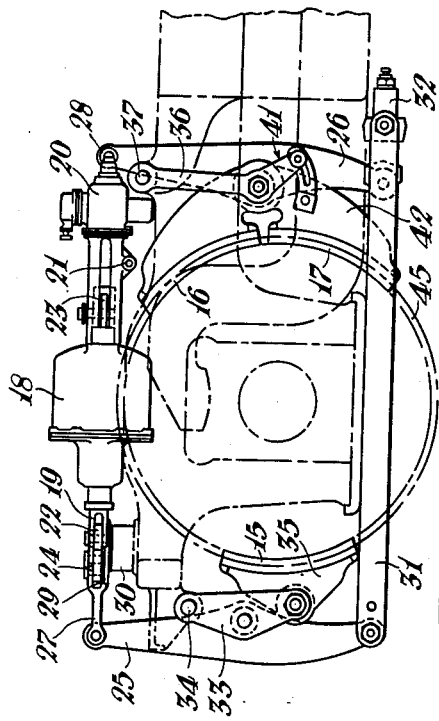
Figure 9:
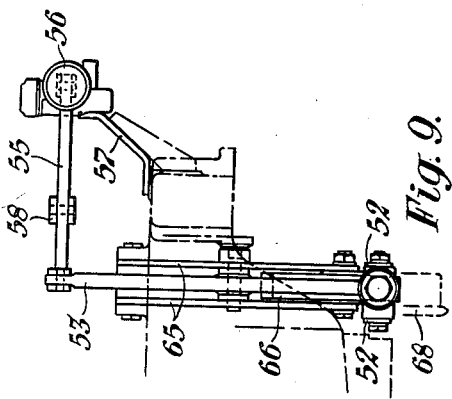
Figure 10:
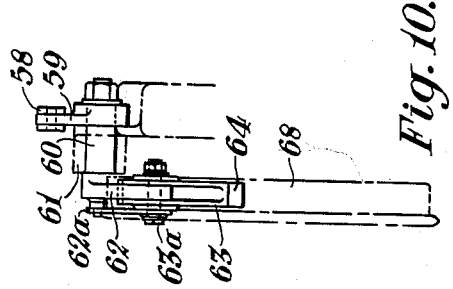
Figure 7:
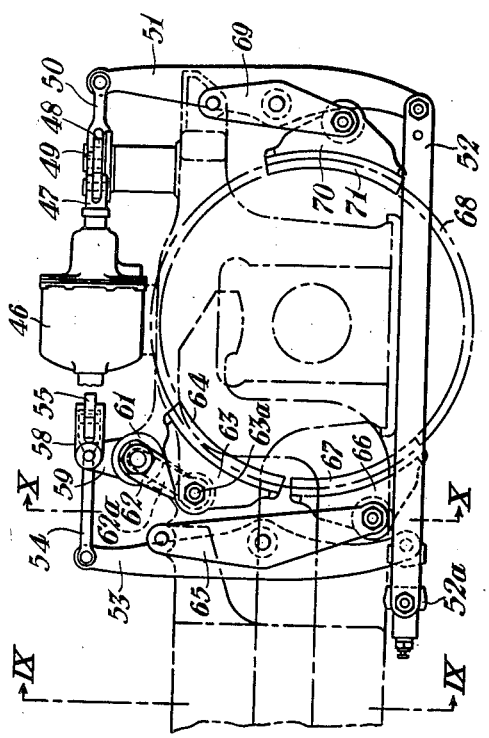
Figure 8:
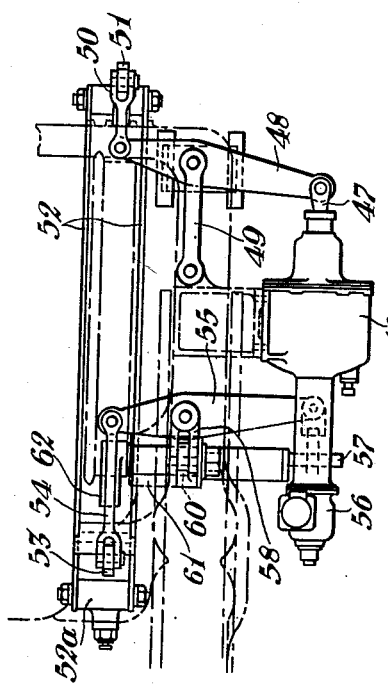

In the accompanying drawings, Fig. 1 is a vector diagram illustrating the reactive and frictional forces applied to a railway truck during braking by a symmetrical arrangement of "outer" brake shoes. Fig. 2 is a similar vector diagram showing forces applied by a symmetrical arrangement of "inner" brake shoes. Fig. 3 is a side elevational view of a railway truck whose front wheel is provided with brake mechanism according to one embodiment of my invention and whose rear wheel is provided with brake mechanism according to a modified form of my invention. Fig. 4 is a top plan view of the front wheel appearing in Fig. 3, with the brake mechanism applied thereto. Fig. 5 is a sectional view taken along the line V—V of Fig. 3, looking in the direction of the arrows. Figs. 6a and 6b taken together form a side elevational view of a six-wheel truck provided with brake mechanism in accordance with my invention. Fig. 7 is a side elevational view of the front wheel of a truck provided with a unit cylinder brake rigging according to another modified form of my invention. Fig. 8 is a top plan view of the wheel and brake rigging of Fig. 7. Fig. 9 is a view taken along the line IX—IX of Fig. 7. Fig. 10 is a view taken along the line X—X of Fig. 7. In several of the figures, certain parts are omitted for the sake of clarity.

Figs. 1 and 2 illustrate by means of vectors the reactive and frictional forces applied to a four-wheel truck during braking by symmetrical arrangements of inner and outer brake shoes. As used herein, the term "inner" brake shoe refers to a shoe acting on the side of a wheel nearest the center of the truck. The term "outer" brake shoe refers to a shoe acting on the side of a wheel farthest from the center of the truck. In the following discussion of Figs. 1 and 2, it will be demonstrated that the sum of the moments acting on the truck due to reactive and frictional forces applied through symmetrically arranged outer brake shoes is always in the same direction and is opposite to the sum of the moments due to similar forces applied through symmetrically arranged inner brake shoes.

Referring to Fig. 1, there is shown diagrammatically a railway truck 1 having front and rear wheels 1A and 1B spaced at equal distances from the truck center 1C. The wheels 1A and 1B are provided with three sets of brake shoes. One set includes the shoes 2A and 2B, another includes the shoes 3A and 3B, and the third includes the shoes 4A and 4B. Each set is symmetrically arranged with respect to the truck center 1C.

The principles involved in an analysis of the forces acting on one brake shoe are generally applicable to all the brake shoes. Therefore, I will first give a complete analysis of the forces acting on the brake shoe 2A, and will indicate how this analysis applies to the other brake shoes by using similar reference characters to indicate the corresponding forces.

When the shoe 2A is applied to the wheel, the wheel reacts against it with a force acting in a direction radially outward from the wheel center. This force is indicated by the vector 2AR in Fig. 1. Due to the rotation of the wheel, a frictional force 2AF is set up in a direction tangential to the wheel. The magnitude of the frictional force 2AF is dependent upon the magnitude of the radial force 2AR and the coefficient of friction between the shoe 2A and the wheel 1A. For the purposes of the present discussion, this coefficient of friction has been taken as 0.25. The length of vector 2AF is therefore illustrated as being 0.25 of the length of the vector 2AR. The total force acting on the truck 1 through the shoe 2A is the resultant of the vectors 2AR and 2AF. Adding these two vectors gives the vector 2AT representing the total force acting on the truck through the shoe 2A.

In order to determine the tipping moment about the center 1C due to the force 2AT, it is convenient to resolve the vector 2AT into horizontal and vertical components. These components appear in the drawing as 2AH and 2AV, respectively.

The various force vectors for the several shoes are given reference characters consisting of the reference character of the shoe followed by the letter R for a radial reaction force, the letter F for a tangential friction force, the letter T for the total force, the letter H for the horizontal component, and the letter V for the vertical component.

Consider now the truck tipping moment caused by the forces acting on the truck through the symmetrically arranged shoes 2A and 2B. The horizontal forces 2AH and 2BH are nearly equal, and are opposite in direction. The resultant of these two opposed forces is therefore small. Furthermore, the moment arm of this small resultant force is short, since both forces act along a horizontal line only a short distance vertically above the truck center. It is therefore safe to ignore these horizontal components from the truck tipping standpoint. The vertical force 2AV produces a counterclockwise moment about the center 1C. The vertical force 2BV produces a clockwise moment about the same center. Since the moment arms of these two forces are equal, and the force 2BV is greater than the force 2AV, it may be seen that the truck tipping moment produced by the symmetrically arranged shoes 2A and 2B is in a clockwise direction about the truck center 1C.

Considering the second symmetrical pair of shoes 3A and 3B, it may be seen that the radial reaction forces 3AR and 3BR are horizontal and aligned with the truck center 1C. The frictional forces 3AF and 3BF are vertical. Therefore the radial and friction forces are themselves the horizontal and vertical components, respectively, of the total forces 3AT and 3BT. Since the horizontal forces 3AR and 3BR pass through the truck center 1C, they produce no tipping moment about that center. The tipping moments due to the vertical forces 3AF and 3BF are both clockwise about the center 1C, and the moment arm of both of these forces is substantially equal to the distance X appearing in the drawing. It may therefore be seen that the net truck tipping moment due to the symmetrically arranged shoes 3A and 3B is clockwise.

Referring now to the third set of shoes 4A and 4B, the horizontal component forces 4AH and 4BH may be neglected as far as truck tipping moments are concerned, since they are nearly equal and opposite and have a small moment arm. The vertical force 4BV has a counterclockwise moment about the center 1C, while the force 4AB has a clockwise moment. The moment arms of these two forces are equal, and the force 4AV is larger than the force 4BV. Therefore the net truck tipping moment due to the shoes 4A and 4B is in a clockwise direction.

From the foregoing discussion, it may be seen that for any symmetrical arrangement of the outer brake shoes with respect to the truck center 1C, the net truck tipping moment is always clockwise if the direction of wheel rotation is assumed clockwise.

In the foregoing discussion, it was tacitly assumed that all the reaction forces acting on the brake shoes are equal. Brake riggings are commonly designed so that the braking and reaction forces on each shoe are equal, so as to keep the wear equal on all the shoes. This assumption is therefore believed to be justified.

Referring to Fig. 2, there is shown a railway truck 5 having wheels 6A and 6B arranged at equal distances from the truck center 5C. These wheels are provided with three sets of brake shoes on their inner sides, arranged symmetrically with respect to the truck center 5C. One set of shoes is indicated at 7A and 7B, the second set at 8A and 8B, and the third set at 9A and 9B. The various forces and force components acting on the brake shoes in Fig. 2 are indicated in the drawing using the same system of notation that was used in Fig. 1. Considering the tipping moment produced by the several sets of shoes, it may be seen that the shoes 7A and 7B produce a large counterclockwise moment due to the force 7AV and a small clockwise moment due to the force 7BV. Therefore, the net tipping moment due to this set of shoes is counterclockwise.

The shoes 8A and 8B produce two counterclockwise moments due to the forces 8AF and 8BF. The total tipping force due to these two shoes is accordingly counterclockwise. The shoes 9A and 9B produce a small clockwise moment due to the force 9AV and a larger counterclockwise moment due to the force 9BV. The shoes 9A and 9B therefore produce a net counterclockwise moment.

From this discussion of Fig. 2, it may be seen that any symmetrical arrangement of shoes of the inner sides of the truck wheels produces a net counterclockwise moment, if the direction of wheel rotation is clockwise.

Although the spacing between the wheels is greater in Fig. 2 than in Fig. 1, this is done for convenience in making the drawing only, and does not affect the foregoing proof.

It has been shown that, assuming clockwise wheel rotation, any symmetrical arrangement of outer shoes produces a clockwise moment, and that any symmetrical arrangement of inner shoes produces a counterclockwise moment. Therefore, in any symmetrical brake shoe arrangement including both inner and outer shoes the moments due to the inner shoes tend to counteract the tipping moments due to the outer shoes. However, since the outer shoes have longer moment arms than the inner shoes, the moments due to the outer shoes predominate. In the following braking arrangements, I minimize or completely eliminate the predominance of the tipping moments due to the outer shoes, by using two inner shoes and one outer shoe on each wheel. The greater number of inner shoes produces a greater tipping moment which compensates for the greater moment arm of the opposing tipping moments of the outer shoes.

While this method of minimizing truck tipping moments is always effective in brake riggings wherein the brake shoes are symmetrically arranged with respect to the truck axis, it may also be used in connection with unsymmetrical shoe arrangements. In such unsymmetrical arrangements, truck tipping may or may not be reduced by using more inner shoes than outer shoes, depending upon whether the tipping moment due to the outer shoes opposes that due to the inner shoes. If the tipping moments of the inner and outer shoes are opposed, then the net tipping moment may always be reduced by using a greater shoe area for the inner shoes.

Referring now to Fig. 3, there is shown one side of a four-wheel truck having a front wheel 10 and a rear wheel 11. The front wheel 10 is braked by an outer shoe 12 and two inner shoes 13 and 14. The rear wheel 11 is similarly braked by an outer shoe 15 and two inner shoes 16 and 17. Although the rigging which supports the two inner shoes 13 and 14 of front wheel 10 is illustrated as being different from the rigging which supports the inner shoes 16 and 17 of rear wheel 11, it should be realized that on any actual truck, similar rigging arrangements would be used for all the wheels. The two different riggings are shown on one truck in the present drawings merely to avoid the necessity of repeating the illustration of the complete truck to illustrate each rigging.

The brake rigging which operates the three brake shoes 12, 13, and 14 of wheel 10 is illustrated in Figs. 3, 4, and 5. It includes a brake cylinder 18 which operates a piston rod 19. An automatic slack adjuster 20, of well-known construction, is attached to the end of cylinder 18 opposite the piston rod 19, and is also partially supported by a bracket 21 attached to the truck frame. One horizontally extending transverse lever 22 has its outer end pivotally attached to the end of piston rod 19. Another horizontally extending transverse lever 23 has its outer end pivotally attached to the automatic slack adjuster 20. Intermediate points on the horizontal transverse levers 22 and 23 are connected by a tie rod 24.

A pair of vertical levers 25 and 26 are positioned adjacent the opposite sides of the wheel 10. The upper ends of the vertical levers 25 and 26 are connected to the inner ends of the transverse levers 22 and 23 by means of links 27 and 28, respectively.

The transverse lever 22 is supported by a pair of wear plates 29 carried by a channel-shaped support 30.

The lower ends of the vertical levers 25 and 26 are connected by a pair of straddle rods 31. The connection between straddle rod 31 and vertical lever 26 includes a manual slack adjuster 32, of any suitable construction.

A hanger lever 33 (see Fig. 3) is pivotally supported on the truck frame by means of pins, one of which is shown at 34, and is pivotally connected at its center to the vertical lever 25. A brakehead 35 is pivotally attached to the lower end of hanger lever 33, and carries the outer brake shoe 12.

A hanger member 36 is pivoted by means of pins 37 to the truck frame. The lower end of hanger member 36 pivotally supports an equalizer lever 38. The equalizer lever 38 is supported by the hanger member 36 near its center, and its opposite arms in turn pivotally support brakeheads 39 and 40, which respectively carry the inner brake shoes 13 and 14. The relative angular positions of hanger member 36 and equalizer lever 38 are yieldably and frictionally determined by a slip-friction pin and slot arrangement generally indicated at 41, of known construction.

The brake shoes, brakeheads, and hanger levers are for the most part omitted from Fig. 4, in order to more clearly illustrate the other parts of the structure there shown.

When the brakes are to be applied, air under pressure is admitted to cylinder 18, causing the piston rod 19 to move to the right as viewed in Figs. 3 and 4. This causes transverse lever 22 to rotate counterclockwise, thereby moving tie rod 24 to the right, and moving link 27 to the left. Two components of motion of the transverse lever 22 are simultaneously taking place. One component is about the inner end of the lever as a fulcrum, and tends to move the tie rod 24 to the right. The other component is about the pivotal connection between lever 22 and tie rod 24 as a fulcrum, and tends to move the inner end of lever 22 and link 27 to the left.

The motion of tie rod 24 to the right is transmitted through transverse lever 23, link 28, and vertical lever 26 to the equalizer 38, and thence to the brake shoes 13 and 14. Movement of link 27 to the left is transmitted through vertical lever 25 and hanger 33 to the brake shoe 12. Straddle rod 31 serves to restrain the lower ends of vertical levers 25 and 26 against relative movement. If for any reason, the upper end of one of the vertical levers 25 and 26 does not move sufficiently to apply its associated brake shoe or shoes, then the tie rod 31 may act upon further movement of the upper end of the opposite vertical lever to transmit a brake applying movement to the vertical lever whose upper end has failed to move.

Referring to the rear wheel 11 in Fig. 3, it may be seen that the brake rigging for the outer shoe 15 is a counterpart of the brake rigging for the outer shoe 12 of the front wheel 10. The inner shoes 16 and 17, on the other hand, are both supported on a brakehead 42 which is pivotally attached to a brake hanger 36 and a vertical lever 26 which are the counterparts of the corresponding elements of the brake rigging of front wheel 10.

The operation of the rigging on the rear wheel 11 is similar to that of the rigging on the front wheel 10, and further description of it is believed to be unnecessary.

The two inner shoes on each wheel produce a truck tipping torque which opposes that of the outer shoes. Although the total braking force applied by the inner shoes is greater because of their greater area (the rigging being designed to produce equal braking forces per unit area on all shoes), the moment arm of the truck tipping force on the outer shoes is greater, so that the two tipping moments counterbalance each other. To make this counterbalancing of torques complete, the ratio of the areas of the inner and outer shoes should be substantially the inverse ratio of the moment arms of the same shoes. For example, if the moment arm of the outer shoes is twice that of the inner shoes, then the inner shoes should have an area twice that of the outer shoes. Of course, this relationship between moment arms and shoe areas does not have to be rigidly followed. Although it represents the ideal relationship, considerable variation from it may be allowed without unduly increasing the net tipping torque.

Figs. 6a–6b

These figures are intended to be viewed side by side, with Fig. 6b at the left. They illustrate a six-wheel locomotive truck to which is applied a brake rigging similar to that applied to the four-wheel truck of Figs. 3, 4, and 5. Figs. 6a–6b illustrate one side only of the truck, including a front wheel 43, a center wheel 44, and a rear wheel 45. The front wheel 43 is provided with a brake rigging which is the same as that provided for the front wheel 10 of the four-wheel truck in Fig. 3. The rear wheel 45 is provided with a brake rigging which is the same as that provided for the rear wheel 11 in Fig. 3. The center wheel 44 is provided with a rigging similar to that provided for front wheel 43, except that it is reversed from left to right, so that the single shoe 12 appears at the left-hand side of wheel 44 and the two shoes 13 and 14 engage the right-hand side of wheel 44.

The front and rear wheels on the opposite side of the truck are provided with brake riggings which are enantiomorphic counterparts of the brake riggings applied to wheels 43 and 45. In other words, the riggings for the front and rear wheels of the six-wheel truck are the same as the riggings for the front and rear wheels of the four-wheel truck. The two center wheels of the six-wheel truck are provided with similar riggings, except that the riggings on the opposite sides of the truck are reversed. By arranging the riggings on the center wheels in this manner, the truck tipping torques of the center wheels are substantially balanced, so that the net truck tipping moment due to the braking forces on the center wheels is very small. It would be possible, of course, to use a symmetrical arrangement of brake shoes on both of the center wheels, so that the truck tipping moments on the opposite sides of each wheel would balance. However, the rigging for such an arrangement would have to be quite different from the rigging for the front and rear wheels of the truck. By using the arrangement shown, it is possible to use corresponding parts for the riggings of all six wheels of the truck.

Figs. 7 to 10

There is illustrated in Figs. 7 to 10 a modified form of brake rigging which may be substituted for that shown on the front wheel 10 of Figs. 3, 4, and 5 or on the rear wheel 11 of Fig. 3.

In this rigging, a brake cylinder 46 operates a piston rod 47 connected to the outer end of a transverse lever 48. An intermediate point on the transverse lever 48 is connected to a fixed support by a link 49. The inner end of transverse lever 48 is connected by a link 50 to the upper end of a vertical lever 51.

The lower end of lever 51 is connected by straddle rods 52 and a slack adjuster 52a to the lower end of a vertical lever 53. The upper end of lever 53 is connected by a link 54 to the inner end of another transverse lever 55. The outer end of lever 55 is supported by an automatic slack adjuster 56 which is attached to the cylinder 46 and to a supporting bracket 57.

An intermediate point on the transverse lever 55 is connected through a clevis link 58 to a crank arm 59 on a crankshaft 60, which passes through a bearing 61 in the truck frame. At the inner end of bearing 61, the crankshaft 60 carries another crank arm 62 which supports at its lower end a brakehead 63 carrying a brake shoe 64.

The angular position of brakehead 63 with respect to crank arm 62 is determined by a slip-friction connection between a brakehead pin 63a (Figs. 7 and 10) and a strap 62a which is connected to crankshaft 60 for rotation therewith. The strap 62a is used because it is relatively light and flexible as compared to the crank arm 62, and is therefore more readily adaptable to the formation of a slip-friction connection with pin 63a by the use of a spring washer on the pin.

A brake hanger lever 65 is pivotally attached at its upper end to the truck frame and at an intermediate point to the vertical lever 53. At its lower end, the hanger 65 carries a brakehead 66 which supports a brake shoe 67.

Both the shoes 64 and 67 engage the inner side of a wheel 68.

A hanger lever 69 is pivoted at its upper end on the truck frame and near its center to the vertical lever 51. At its lower end, the hanger lever 69 carries a brakehead 70 which supports a brake shoe 71 in a position to engage the outer side of the wheel 68.

Operation of Figs. 7 to 10

When the brakes are to be applied, air under pressure is admitted to cylinder 46, moving piston rod 47 to the right as viewed in Figs. 7 and 8. This moves the outer end of transverse lever 48 to the right, causing it to rotate counterclockwise about its pivotal connection with link 49. The inner end of lever 48 is thereby moved to the left, moving link 50 and the upper end of vertical lever 51 to the left.

This moves hanger lever 69 and brakehead 70 to the left until brake shoe 71 engages wheel 68. Thereafter, the vertical lever 51 fulcrums about its connection with hanger 69, moving the lower end of lever 51 to the right, carrying the straddle rods 52 in the same direction. The lower end of vertical lever 53 is thereby moved to the right, carrying the hanger 65 to the right and thereby moving brake shoe 67 into engagement with wheel 68. After brake shoe 67 engages the wheel, vertical lever 53 pivots counterclockwise about its connection with hanger 65, thereby moving the upper end of lever 53 to the left, and carrying link 54 and the inner end of transverse lever 55 to the left. Lever 55 fulcrums about its outer end, carrying link 58 and crank arm 59 to the left. Crankshaft 60 is thereby rotated counterclockwise, carrying the crank arm 62 to the right to bring brake shoe 64 into engagement with wheel 68.

Although the brake shoes 71, 67, and 64 engage the wheel in that sequence, it should be appreciated that no appreciable braking force will be transmitted to any shoe until all three shoes are engaging the wheel. This is because the rigging is arranged in the customary manner to require a reactive force at every shoe before any shoe can apply an appreciable braking force to the wheel.

From the foregoing, it should be apparent that in the several braking arrangements I have shown, the truck tipping moments due to the application of braking forces to the wheels are reduced to a minimum. Furthermore, since the brake shoes are arranged to be symmetrical with respect to the truck axis or effectively so, they may be used in trucks which are adapted for normal operation in either direction. Also, since substantially all of the brake rigging is mounted outboard of the truck wheels, the riggings are particularly well adapted for use with electrically propelled locomotives where the space between the wheels is largely taken up by the propulsion mechanism.

Although my invention is shown and described herein as applied to wheel brakes, wherein the shoes act directly on the running surface of the wheel, it may be readily applied to disk or drum type brakes, wherein the shoes act on the surface of a disk or drum which rotates concurrently with the wheel.

Although I have herein shown and described several forms of brake mechanism embodying my invention, it is understood that various changes and modifications may be made therein within the scope of the appended claims without departing from the spirit and scope of my invention.

Having thus described my invention, what I claim is:

1. Brake mechanism for a six-wheel vehicle truck comprising a braking surface on each wheel, three brake shoes for engaging each said surface, the three brake shoes for each end wheel of the truck being arranged with one shoe on the side of the wheel farthest from the center and two shoes on the side of the wheel nearest the center, the three brake shoes on the two opposite middle wheels being arranged oppositely, with two shoes on one side of each middle wheel and one on the other side, and means for simultaneously operating all said shoes into engagement with their braking surfaces.

2. Brake mechanism, comprising a rotatable element having a braking surface, a brake cylinder, a piston rod operated by said cylinder, a pair of transverse levers, a connection between the outer end of one lever and the piston rod, a pivot for the outer end of the other lever, a tie rod connecting intermediate points on the two levers, a pair of vertical levers located at opposite sides of the element, a pair of links connecting the inner ends of the transverse levers to the upper ends of the vertical levers, a second tie rod connecting the lower ends of the vertical levers, a pair of brake hangers located at opposite sides of the element, pivotal connections between said brake hangers and intermediate points on said vertical levers, an equalizer lever pivotally connected at its center to one hanger, a pair of brakeheads pivotally connected to the ends of the equalizer lever, a third brakehead pivotally connected to the other hanger, and a brake shoe on each of said brakeheads.

3. Brake mechanism for a vehicle wheel, comprising a brake cylinder, a piston rod operated by said cylinder, a pair of transverse levers, a connection between the outer end of one lever and the piston rod, a pivot for the outer end of the other lever, a tie rod connecting intermediate points on the two levers, a pair of vertical levers located at opposite sides of the wheel, a pair of links connecting the inner ends of the transverse levers to the upper ends of the vertical levers, a second tie rod connecting the lower ends of the vertical levers, a pair of brake hangers located at opposite sides of the wheel, pivotal connections between said brake hangers and intermediate points on said vertical levers, a pair of brakeheads each pivotally connected to one of said hangers, two brake shoes on one of said brakeheads, and a third brake shoe on the other brakehead.

4. Brake mechanism for a vehicle wheel, comprising a brake cylinder, a piston in said cylinder, a transverse lever having one end pivotally connected to the piston, a link connecting an intermediate point on the transverse lever to a fixed pivot, a pair of vertical levers located at opposite sides of the wheel, a link connecting the inner end of the transverse lever to the upper end of one of the vertical levers, a tie rod connecting the lower ends of the vertical levers, a pair of brake hangers at opposite sides of the wheel, a brakehead pivoted on each hanger, a brake shoe on each brakehead, a pivotal connection between each hanger and an intermediate point on the adjacent vertical lever, a second transverse lever having its outer end pivotally suported, a second link connecting the upper end of the other vertical lever to the inner end of the second transverse lever, a crank pivotally mounted and having two crank arms, a third link connecting the end of one arm to an intermediate point on the second transverse lever, a third brakehead pivoted on the end of the other crank arm, and a brake shoe on said third brakehead.

5. Brake mechanism for a vehicle wheel, comprising a brake cylinder, a piston rod operated by said cylinder, a pair of transverse levers, a connection between the outer end of one lever and the piston rod, a pivot for the outer end of the other lever, a tie rod connecting intermediate points on the two levers, a pair of vertical levers located at opposite sides of the wheel, a pair of links connecting the inner ends of the transverse levers to the upper ends of the vertical levers, a second tie rod connecting the lower ends of the vertical levers, a pair of brake hangers located at opposite sides of the wheel, pivotal connections between said brake hangers and intermediate points on said vertical levers, a brakehead pivotally supported by each hanger, and at least one brake shoe on each brakehead.

6. Brake mechanism for a vehicle wheel, comprising a brake cylinder, a piston rod operated by said cylinder, a pair of transverse levers, a connection between the outer end of one lever and the piston rod, a pivot for the outer end of the other lever, a tie rod connecting intermediate points on the two levers, a pair of vertical levers located at opposite sides of the wheel, means connecting the inner end of each of the transverse levers to the upper end of one of the vertical levers, a second tie rod connecting the lower ends of the vertical levers, a pair of brake hangers located at opposite sides of the wheel, pivotal connections between said brake hangers and intermediate points on said vertical levers, a brakehead pivotally supported by each hanger, and at least one brake shoe on each brakehead.

7. Brake mechanism for a vehicle wheel, comprising a brake cylinder, a piston rod operated by said cylinder, a pair of transverse levers, a connection between the outer end of one lever and the piston rod, automatic slack adjuster means pivotally supporting the outer end of the other lever, a tie rod connecting intermediate points on the two levers, a pair of vertical levers located at opposite sides of the wheel, means connecting the inner end of each of the transverse levers to the upper end of one of the vertical levers, a second tie rod including a manual slack adjuster connecting the lower ends of the vertical levers, a pair of brake hangers located at opposite sides of the wheel, pivotal connections between said brake hangers and intermediate points on said vertical levers, a brakehead pivotally supported by each hanger, and at least one brake shoe on each brakehead.

8. Brake mechanism for a vehicle wheel, comprising a brake cylinder, a piston rod operated by said cylinder, a pair of transverse levers, a connection between the outer end of one lever and the piston rod, a pivot for the outer end of the other lever, a tie rod connecting intermediate points on the two levers, a pair of vertical levers located at opposite sides of the wheel, means connecting the inner end of each of the transverse levers to the upper end of one of the vertical levers, a second tie rod connecting the lower ends of the vertical levers, a pair of brake hangers located at opposite sides of the wheel, pivotal connections between said brake hangers and intermediate points on said vertical levers, two brake shoes supported on one of said hangers, and one brake shoe supported on the other hanger.

9. Brake mechanism for a vehicle wheel, comprising a brake cylinder, a piston rod operated by said cylinder, a pair of transverse levers, a connection between the outer end of one lever and the piston rod, a pivot for the outer end of the other lever, fulcrum means pivotally connected to intermediate points on the two levers, a pair of vertical levers located at opposite sides of the wheel, means connecting the inner end of each of the transverse levers to the upper end of one of the vertical levers, a tie rod connecting the lower ends of the vertical levers, a pair of brake hangers located at opposite sides of the wheel, pivotal connections between the brake hangers and intermediate points on the vertical levers, and at least one brake shoe supported on each hanger.

EMIL G. MUELLER.

References Cited in the file of this patent

UNITED STATES PATENTS

| Number | Name | Date |
|---|---|---|
| 1,979,644 | Saito | Nov. 6, 1934 |
| 2,148,365 | Baselt | Feb. 21, 1939 |
| 2,169,751 | Williamson | Aug. 15, 1939 |
| 2,336,970 | Tack | Dec. 14, 1943 |
| 2,343,939 | Tack | Mar. 14, 1944 |
| 2,431,579 | Mueller | Nov. 25, 1947 |
| 2,446,659 | Mueller | Aug. 10, 1948 |